US011526421B2

(12) United States Patent
Sundaresan et al.

(10) Patent No.: US 11,526,421 B2
(45) Date of Patent: Dec. 13, 2022

(54) DYNAMIC EXPERIMENTATION EVALUATION SYSTEM

(71) Applicant: MICROSOFT TECHNOLOGY LICENSING, LLC., Redmond, WA (US)

(72) Inventors: Neelakantan Sundaresan, Bellevue, WA (US); Cenzhuo Yao, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 254 days.

(21) Appl. No.: 16/132,334

(22) Filed: Sep. 14, 2018

(65) Prior Publication Data

US 2019/0227903 A1    Jul. 25, 2019

Related U.S. Application Data

(60) Provisional application No. 62/619,809, filed on Jan. 21, 2018.

(51) Int. Cl.
*G06F 11/36* (2006.01)
*G06F 8/71* (2018.01)
*G06F 11/34* (2006.01)

(52) U.S. Cl.
CPC ......... *G06F 11/3608* (2013.01); *G06F 8/71* (2013.01); *G06F 11/3438* (2013.01); *G06F 11/368* (2013.01); *G06F 11/3664* (2013.01); *G06F 11/3688* (2013.01); *G06F 2201/865* (2013.01); *G06F 2201/875* (2013.01)

(58) Field of Classification Search
None
See application file for complete search history.

(56) References Cited

U.S. PATENT DOCUMENTS

| 7,171,586 | B1  | 1/2007  | Gross et al. |
| 9,141,522 | B1  | 9/2015  | Zias |
| 10,699,294 | B2 * | 6/2020 | Katariya .............. G06N 7/005 |
| 2011/0251812 | A1 * | 10/2011 | Gurov ............... G01R 31/2894 |
| | | | 702/82 |

(Continued)

FOREIGN PATENT DOCUMENTS

AU    2008272900 A1 *  1/2010   ............. G06Q 30/02

OTHER PUBLICATIONS

Kohavi, Unexpected Results in Online Controlled Experiments, ACM SIGKDD Explorations Newsletter, vol. 12, No. 2 (Year: 2011).*

(Continued)

*Primary Examiner* — Jerry O'Connor
*Assistant Examiner* — Philip N Warner

(57) ABSTRACT

A dynamic experimentation evaluation system provides a framework in which a continuous stream of metric data is monitored to establish a causal relationship between changes in a software program and the effect of user-observable behavior. In one aspect, an A/B test is performed continuously on a stream of metric data representing the usage of a control version of software product and the usage of a treatment version of the software product. A sequential probability ratio test (SPRT) is used as the test statistic to determine when to terminate the test and produce results within a specific confidence interval and controlled error rate.

13 Claims, 6 Drawing Sheets

(56) References Cited

U.S. PATENT DOCUMENTS

| | | | | |
|---|---|---|---|---|
| 2013/0209982 A1* | 8/2013 | Rooks | ............... | G09B 7/00 434/350 |
| 2014/0278198 A1* | 9/2014 | Lyon | ............... | G06Q 30/0201 702/179 |
| 2014/0282049 A1* | 9/2014 | Lyon | ............... | G06F 3/0482 715/744 |
| 2015/0012852 A1 | 1/2015 | Borodin et al. | | |
| 2016/0125749 A1* | 5/2016 | Delacroix | ............... | G09B 7/00 434/322 |
| 2017/0083429 A1* | 3/2017 | Pekelis | ............... | G06F 11/3688 |
| 2017/0323331 A1* | 11/2017 | Malek | ............... | G06Q 30/0246 |
| 2018/0082326 A1* | 3/2018 | Vlassis | ............... | G06Q 30/0242 |
| 2018/0341975 A1* | 11/2018 | Fellows | ............... | G06F 16/9577 |
| 2019/0068360 A1* | 2/2019 | Bhattacharya | ............... | H04L 9/3297 |
| 2019/0095828 A1* | 3/2019 | Xu | ............... | G06Q 10/0635 |

OTHER PUBLICATIONS

Kohavi, Online Controlled Experiments at Large Scale, KDD, Proceedings, KDD '12 (Year: 2012).*
Kohavi, Online Controlled Experiments at large scalle, KDD, Proceedings, KDD '13 (Year: 2013).*
Wald, Sequential Tests of Statistical Hypothesis, 1945, The Annals of Mathematical Statistics (Year: 1945).*
Kohavi, Unexpected Results in Online Controleld Experiments, ACM SIGKDD Explorations Newsletter, vol. 12, No. 2 (Year 2011).*
Kohavi, Online Ctonrolled Experiments at Large Scale, KDD, Proceedings, KDD '12 (Year 2012).*
Kohave, Online Controlled Experiments at Large Scale, KDD, Proceedings, KDD '13 (Year 2013).*
Wald, Sequential Tests of Statistical Hypothesis, 1945, The Annals of MAthmatical Statistics (Year: 1945).*
"Sequential Probability Ratio Test—Wikipedia", Retrieved from: https://web.archive.org/web/20170210213356/https://en.wikipedia.org/wiki/Sequential_probability_ratio_test, Feb. 10, 2017, 5 Pages.
Johari, et al., "Peeking at A/B Tests", In Proceedings of the 23rd ACM SIGKDD International Conference on Knowledge Discovery and Data Mining, August 13, 2017, pp. 1517-1525.
"International Search Report and Written Opinion Issued in PCT Application No. PCT/US2019/013420", dated Oct. 7, 2019, 21 Pages.
"Office Action Issued in European Patent Application No. 19704096.7", dated Mar. 24, 2022, 10 Pages.

* cited by examiner

DYNAMIC EXPERIMENTATION EVALUATION SYSTEM

CROSS-REFERENCE TO RELATED APPLICATION

This application claims the benefit of U.S. Provisional Application No. 62/619,809 filed on Jan. 21, 2018.

BACKGROUND

A controlled experiment is a testing methodology that provides valuable insight into the impact of different variants on a user's behavior using actual performance data. An A/B test is one such controlled experiment that involves the comparison of two variants to determine which of the variants is more likely to achieve a desired result. In web analytics, A/B testing is often used to compare two different versions of a webpage in order to determine the effect of each web page on a user's behavior. The version of the web page that produces positive results is determined and validates that the version of the web page showing positive results should be used.

The use of the A/B test produces valid results when the experiment adheres to certain guidelines. The guidelines include setting a minimum detectable effect, a pre-configured sample size made before conducting the test and running the test until the fixed number of samples is collected. These guidelines are implemented in order to ensure that the probability of detecting any true effect with the predetermined sample size is maximized given the bound on the proportion of false positives. However, these guidelines place restrictions on the use of the A/B test for real time decision making.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A dynamic experimentation evaluation system includes an A/B test that continuously evaluates the users' behavior while engaged with one of two versions of a software product (i.e., software application, program) in real-time. The system monitors metric data generated from the usage of one group of users using a control version of the software product and another group of users using a treatment version of the software product. The A/B employs a sequential probability ratio test (SPRT) to continuously assess the differences between the users' behavior in both versions of the software product and to generate alerts in real-time. The test statistic generated from the SPRT is used to continuously evaluate the stream of metric data until statistical significance is achieved.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
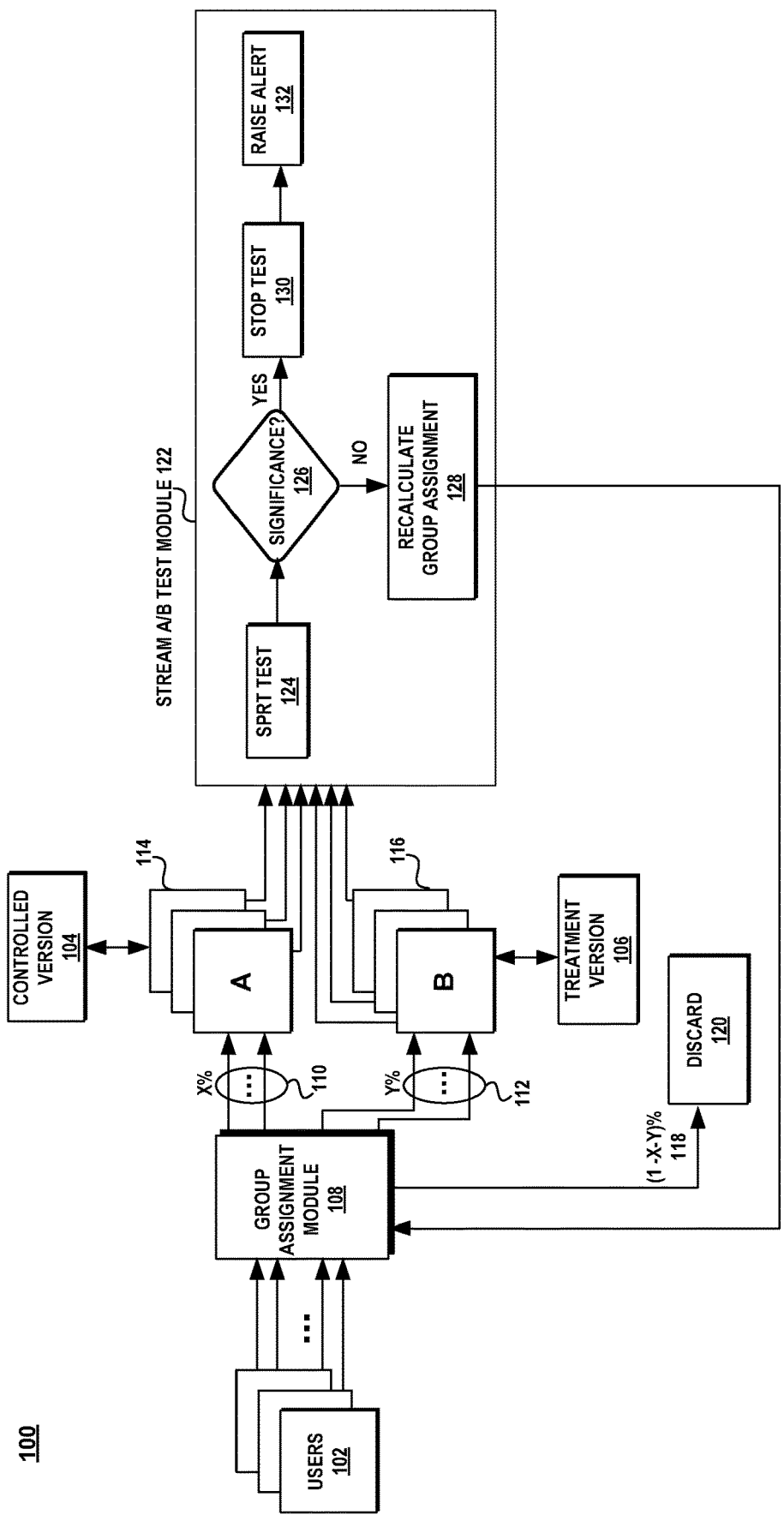
FIG. 1 illustrates an exemplary dynamic experimentation evaluation system for performing an A/B test to monitor a continuous stream of data in real time.

The subject matter disclosed pertains to a methodology that monitors a continuous stream of metric data to establish a causal relationship between changes in a software program and their influence of user-observable behavior. In one aspect, the causal relationship is used to detect significant differences between the two versions of a software program to reject or accept different hypotheses about the relationship between the two versions. The outcome of the test may be used to generate real-time alerts.

An A/B test is an experiment that tests version A with version B. The A/B test uses a statistical hypothesis test to compare a control version (i.e., group A) with a treatment version (i.e., group B) in order to determine if a causal relationship exists between the two versions. The A/B test evaluates whether the users treat the control version (i.e., group A) differently from the treatment version (i.e., group B) by performing a statistical test. The treatment version is statistically different from the control version if the statistical test rejects a null hypothesis. For example, the null hypothesis $H_0$ may assume that the two versions are not different, $H_0: A=B$, and that any observed differences during the experiment are due to random fluctuations. An alternative hypothesis $H_1$ challenges the null hypothesis, $H_1: A\,!\!=\!B$.

Most A/B tests are conducted using a t-test (student's t-test) or a z-test. The t-test is a statistical hypothesis test in which the test statistic follows a student's t-distribution under the null hypothesis. The z-test is another statistical hypothesis test in which the test statistic follows a normal distribution. The test result is summarized in a p-value which is used to reject the null hypothesis when the p-value is less than a prescribed confidence level $\alpha$. The confidence interval defines the level of error that is acceptable in the test. In hypothesis testing, there are three possible outcomes: no error; Type I error; and Type II error. A Type I error "$\alpha$" is the probability of rejecting the null hypothesis when it is correct (i.e., false positive). A Type II error "$\beta$" is the probability of not rejecting the null hypothesis when it is in fact incorrect (i.e., false negative).

An A/B test operates in a fixed-horizon configuration where the total size of the samples needs to be obtained before the test is performed. A drawback of this fixed-horizon configuration is that the test may be concluded without having obtained enough samples to meet the desired statistical power. Since the test is not performed until the desired sample size is obtained, this limits the ability of the system to respond dynamically in real time to an adverse situation.

In one aspect, the A/B test disclosed herein overcomes these drawbacks by utilizing a sequential probability ratio test (SPRT) as the statistical hypothesis test. The SPRT is a hypothesis test for sequential samples. The SPRT technique analyzes successive samples of a sampled parameter or metric. The sequence of sampled differences between the control and treatment for a monitored metric should be distributed according to a distribution function around a mean of zero, if there is indeed no difference. A test statistic is calculated and compared to one or more decision limits or thresholds. The SPRT test statistic is the likelihood ratio statistic $\lambda^n$, which is the ratio of the probability that a hypothesis test $H_1$ is true to the probability that a hypothesis $H_0$ is true:

$$\lambda^n = \frac{P(y1, y2, \ldots, yn | H1)}{P(y1, y2, \ldots, yn | H0)},$$

where $y_n$ are the individual samples, and $H_n$ are the probability distributions for those hypotheses.

In SPRT, there is no fixed sample size. Instead, the evaluation system picks up the data as it arrives in real-time and performs the test continuously without waiting to receive a target sample size of observations. If no conclusion can be reached, more samples are obtained and tested with the previously-received group of samples. The test may stop in favor of the null hypothesis or the null hypothesis may be rejected in view of the alternate hypothesis.

The A/B test disclosed herein receives a continuous stream of metric data from users engaged with a software product at different stages of their engagement. The metric data is generated from different events as a user engages with the product at different times. The metric data is associated with a particular event. When a user enters the A/B test, the user is assigned to either group A or group B and uses the version of the software product associated with its assigned group. As new users participate into the A/B test, the assignment of the user to a particular group is based on the outcome of the SPRT test. The A/B test continues receiving the metric data continuously until the SPRT test determines that enough samples have been tested.

The SPRT statistical test is used to determine when the comparison of the metrics has reached statistical significance within a target error rate thereby indicating when the test can stop and the results are output. When the SPRT statistical test does not detect statistical significance, a power analysis is used to adjust the assignment of new users into a respective group in order to allocate enough resources for this experiment to achieve conclusion.

Attention now turns to a further discussion of the system, devices, components, and methods utilized in the dynamic experimentation evaluation system.

System

FIG. 1 illustrates a block diagram of an exemplary system 100 in which various aspects of the invention may be practiced. As shown in FIG. 1, system 100 includes a group of users 102 engaged in a controlled experiment. In one aspect, the experiment studies the users' behavior while using one of two different variants of a software product. The users 102 are randomly assigned to use either a control version 104 of the software product or a treatment version 106 of the software product. The users 102 assigned to use the control version are part of the group A 114 and the users assigned to use the treatment version are part of the group B 116. The control version 104 may be a production version of the software product that has been tested and released for public distribution. The treatment version 106 may be a version of the software product that has been enhanced with different features than the control version or contains alterations not found in the control version 104.

The assignment of a user to either the control version or the treatment version is random and performed by the group assignment module 108. However, the percentage of users that are assigned to a particular group is based on an objective that strives to obtain accept or reject the null hypothesis with a statistically sufficient sample size that meets the target error rate. As shown in FIG. 1, the group assignment module 108 determines an initial assignment estimate to split the total number of users into group A by X % (110), into group B by Y % (112), and to discard 120 the residual amount (1−X−Y) % (118).

Different events that occur during a user's usage of the software product are monitored for each user in the experiment. An event represents an action performed by a user that is triggered by the application in response to a user action, directly or indirectly. In one aspect, the events may include installation of the software product, opening the software product, starting the software product, using a specific feature of the software product, experiencing a crash or hang, experiencing other types of failures during execution of the software product, and so forth. However, it should be noted that the system and techniques described herein are not limited to this particular aspect and that other events may be used.

In one aspect, an agent (not shown) is embedded in the control and treatment version of the software product. The agent generates a metric upon occurrence of an associated event. The events are user-defined and configured before the experiment runs. The events occur during the users' usage of the software product. The metrics are continuously streamed to the stream A/B test module 118. The metric contains a measurement value associated with the event. For example, an event can be the installation of the software product and the metric can be the amount of time the version of the software product took to be installed.

The stream A/B test module 118 uses the SPRT test 120 to test a simple hypothesis $H_0$ that $p_0 < p_1$ against a single alternative $H_1$ that $p_1 < p_0$ where:

$Pr(X_i=1|H_0)=1-Pr(X_i=0|H_0)=p_0$ and $Pr(X_i=1|H_1)=1-Pr(X_i=0|H_1)=p_1$.

The test statistics is computed as follows:

$$\lambda_m = \sum_{i=1}^{m} Z_i \qquad (1),$$

where m is the number of effective sample pairs, where an effective sample pair contains a metric value from a group A user and a metric value from a group B user for the same event which shows that there is one failure and one success (i.e., (0,1) or (1,0)), an ineffective sample pair does not contain any difference between the treatment and control versions and is represented by the sample pairs (0,0) or (1,1);

where $\lambda_m$ represents the count of effective sample pairs representing a success, where a success supports the null hypothesis and a failure supports the alternate hypothesis;

where $Z_i$ represents a binary value associated with the ith effective sample pair, a success is defined by the experiment as a sample pair containing (0,1) or (1,0) and a failure is defined by the experiment as the sample pair containing the opposite value. For instance, if success is represented as (0,1), then failure is represented as (1,0) and if success is represented as (1,0) then failure is represented as (0,1);

where $p_0$ is the conversion rate for the control version and $p_1$ is the conversion rate for the treatment version, the conversion rate is the percentage of users that take a desired action, such as use a particular feature, download the software product, install the software product, and so forth.

As the samples of the metrics arrive sequentially from both users A and B, the value of $Z_i$ moves upward when there is an effective sample pair representing a success and remains the same otherwise. When $Z_i$ crosses either of the two user-specified boundaries, $a_m$ and $r_m$, corresponding to the hypotheses, the test terminates and the corresponding hypothesis is selected. Hence, the SPRT test 120 for testing $H_0$ against $H_1$ is then defined as follows: Given two user-defined boundaries of the SPRT test, $a_m$ and $r_m$, where $a_m < r_m$, at each stage m of the test, the value of $\lambda_m$ is computed as in (1) above, and then when $\lambda_m <= a_m$, accept $H_0$ and terminate the test, (2)

when $\lambda_m >= r_m$, accept $H_1$ and terminate the test, (3)

when $a_m < \lambda_m < r_m$, continue sampling, where $a_m$ and $r_m$ depend on the desired Type 1 and Type 2 errors, $\alpha$ and $\beta$. The Type I and Type II errors are decided prior to the experiment in order set the boundaries appropriately (4), and where m represents a stage in the test where one or more effective sample pairs are tested.

Equations (2) and (3) above are used to determine statistical significance, which is either significantly worse or significantly better relative to the hypotheses (block 126—yes), in which case the stream A/B test is stopped (block 130). In the event the test determines that the performance of one version is statistically worse, an alert may be raised (block 132). The alert may be used to terminate the usage of the poor performing version of the software product and/or to report the outcome of the test.

Figure 2:
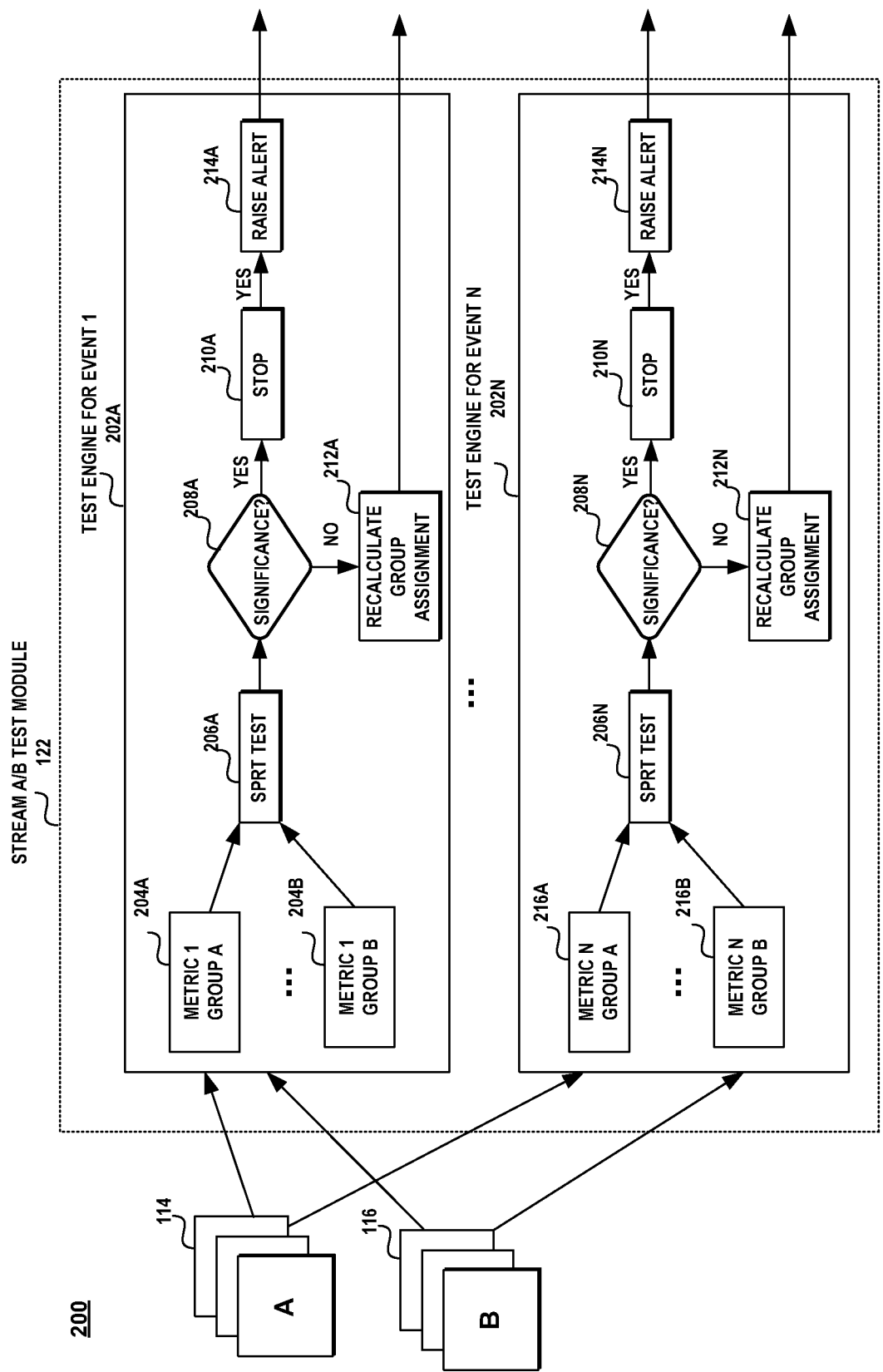
FIG. 2 is a block diagram illustrating an exemplary technique for performing the A/B test on a continuous stream of data in real time.

FIG. 2 shows the stream A/B test module 122 in further detail. The stream A/B test module 122 receives a continuous stream of metrics from both the users in group A 114 and the users in group B 116. The metrics are related to a particular event and the test produces metrics from multiple events. The stream A/B test module 118 routes each metric to a particular test engine corresponding to its associated event (202A-202N). A metric associated with a group A user (block 204A, 214A) is compared with a metric associated with a group B user (block 204B, 214B) for the same event using the SPRT test when an effective sample pair is received (206A-206N). The SPRT test is not applied to a sample pair when there is no difference between the values (e.g., (0,0), (1,1)).

The SPRT test generates the test statistic $\lambda_m = \Sigma_{i=1}^{m} Z_i$ and compares it with the predefined thresholds, $a_m$ and $r_m$, to determine statistical significance (block 208A/N—yes) or no statistical significance (block 208A/N—no). If the outcome of the SPRT test indicates no statistical significance (block 208A/N—no) then the group assignment for new users is adjusted (block 212A/N). If the outcome of the SPRT test indicates statistical significance (block 208A/N), then the test stops (block 210A-N) and an alert may be raised (block 214A/N).

It should be noted that FIGS. 1 and 2 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
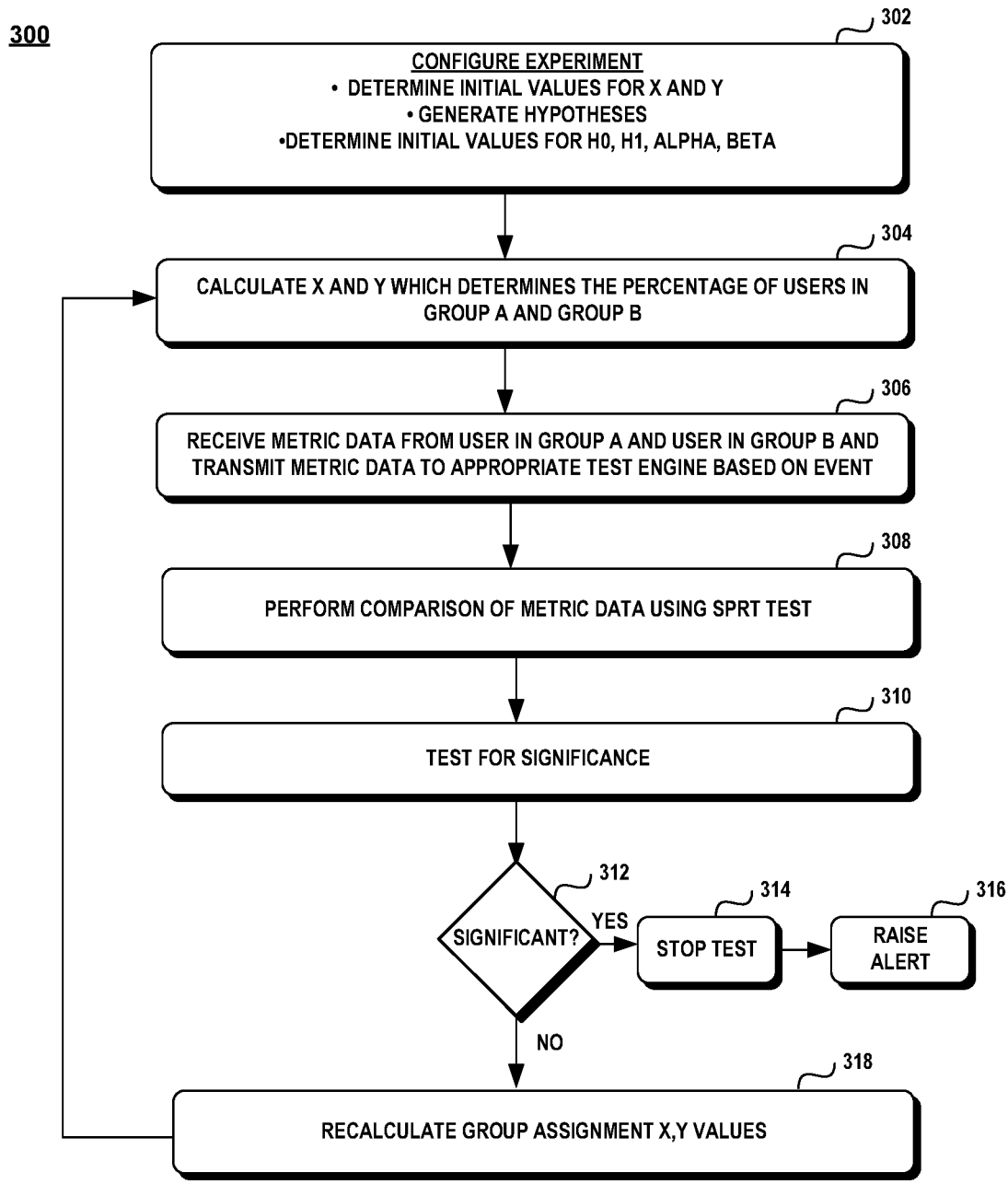
FIG. 3 is a flow diagram illustrating an exemplary method for performing the A/B test on a continuous stream of data in real time.

Turning to FIG. 3, there is shown one aspect of a method 300 for performing an A/B test with continuously streaming data. Initially, the configuration for the A/B test is set by defining the experiment (block 302). Various configurations of the A/B test are possible. In one aspect, the A/B test is configured to monitor the conversion rate of two versions of a software product when there is no prior information given about the probability distribution of the observed data. In this particular configuration, the observed values are associated with a particular event and represented as a binary value or output.

For this particular A/B test, the input variables that need to be defined for the A/B test are as follows:

(i) $h_0$: the null hypothesis $p_0 < p_1$, the value is $h_0 = [(1-p_0) p_1]/[(1-p_0)p_1 + p_0(1-p_1)]$;

(ii) $h_1$: the alternative hypothesis $p_0 > p_1$, the value of $h_1 = [(1-p_1) p_0]/[(1-p_0)p_1 + p_0(1-p_1)]$;

(iii) alpha: the Type I error which represents the false positive rate, $\alpha = 0.05$;

(iv) beta: the Type II error which represents the false negative rate, $\beta = 0.2$;

(v) the observed values from user group A;

(vi) the observed values from user group B;

(vii) the threshold for accepting the null hypothesis, $a_m$;

(viii) the threshold for rejecting the null hypothesis, $r_m$.

$$\text{The threshold } a_m = \left[\log \frac{\beta}{1-\alpha}\right] \Big/ \left[\log \frac{p_1}{p_0} - \log \frac{1-p_1}{1-p_0}\right] + n\left[\left(\log \frac{1-p_1}{1-p_0}\right) \Big/ \left(\log \frac{p_1}{p_0} - \log \frac{1-p_1}{1-p_0}\right)\right], \quad (5)$$

and $$\text{the threshold } r_m = \left[\log \frac{1-\beta}{\alpha}\right] \Big/ \left[\log \frac{p_1}{p_0} - \log \frac{1-p_1}{1-p_0}\right] + n\left[\left(\log \frac{1-p_1}{1-p_0}\right) \Big/ \left(\log \frac{p_1}{p_0} - \log \frac{1-p_1}{1-p_0}\right)\right], \quad (6)$$

where n is an estimate of the sample size needed for the test.

Next, the percentage of users that are assigned into group A or group B is calculated (block 304). The assignment of a particular user into group A and B is random. However, this differs from the percentage of users that are assigned into group A and group B. The percentage of users assigned into group A is represented by X and the percentage of users assigned to group B is represented by Y. A power analysis is used to compute X and Y.

The power analysis formula is used to estimate the sample size needed to produce a confidence interval estimate with a specified margin of error (precision) or to ensure that a test of hypothesis has a high probability of detecting a meaningful difference in the parameter. The power analysis ensures that there is a sufficient number of participants to adequately address the hypotheses. An inadequate number of users or an excessively large number of users are both wasteful in computational resources.

Initially, X and Y can be computed based on significance level of 5% as follows:

$$X = [-1.96\sigma p - (p_0 - p_1)]/\sigma_{up},$$

$$\text{where } \sigma p = \sqrt{p(1-p)\left(\frac{1}{n_1} + \frac{1}{n_2}\right)},$$

$$\sigma_{up} = \sqrt{\frac{p0(1-p0)}{n_1} + \frac{p1(1-p1)}{n_2}},$$

and $Y=[1.96\sigma p-(p_0-p_1)]/\sigma_{up}$, where $p$ is the average of $p_0$ and $p_1$, where $p_0$ is the conversion rate of the control version,
where $p_1$ is the conversion rate of the treatment version, and
$n_1$ and $n_2$ are the sample sizes for the control version and the treatment version respectively. The values for n1 and n2 may be obtained through simulation to obtain the initial values based on a baseline conversion rate for p0 and an expected increase (p1–p0). The baseline conversion rate is estimated on the current performance of the software product since it is assumed that the performance of the control version should be the same as the performance of the current product.

As the event data is received, it is transferred to the test engine corresponding to the event (block 306). The test engine only receives the effective sample pairs (i.e., (0,1), (1,0)) and not the sample pairs that do not reflect a difference (i.e., (1,1), (0,0)). The binary output from an effective sample pair is represented as a pair at each observation i as either (0,1) or (1,0). As the effective sample pairs arrive sequentially from group A and group B, the accumulated sum, $Z_i$, moves upward or downward. When $Z_i$ crosses either of the two user-specified boundaries, $a_m$ or $r_m$, corresponding to the hypotheses, the test terminates and the corresponding hypothesis is selected. Hence, the SPRT test 120 for testing $H_0$ against $H_1$ is then defined as follows: Given two user-defined boundaries of the SPRT test, $a_m$ and $r_m$, where $a_m<r_m$, at each stage m of the test, the value of λm is computed as in (1) above (block 308). The test for significance is as follows (block 310):

when λm<=$a_m$, accept $H_0$ and terminate the test, (block 312—yes, block 314)

when λm>=$r_m$, accept $H_1$ and terminate the test, (block 312—yes, block 314)

when $a_m$<λm<$r_m$, recalculate the group assignment percentages X and Y (block 318).

The group assignment percentages X and Y are recalculated based on the test statistic from the SPRT test. The threshold equation for $a_m$ (5) above is used to determine the value of X, which is the value of n in the equation, when the value of the test statistic is substituted for $a_m$. The threshold equation for $r_m$ (6) above is used to determine the value for Y, which is the value of n in the equation, when the value of the test statistic is substituted for $r_m$. As new users participate in the test, they are assigned to group A or group B based on the recomputed percentages X and Y.

It should be noted that the A/B test described herein is not limited to the double dichotomies scenario described above and can be utilized in other scenarios that utilize binary output, continuous output and/or integer output. The SPRT test may be configured for other scenarios with other population probability distributions as shown in Table I below. As shown in Table One, the column labeled "output" denotes the type of output (binary, continuous), the column labeled "parameter" represents the value that is tested, the column labeled "batch size" represents the number of values tested at each time interval, and the column labeled "distribution" represents the probability distribution associated with the parameters.

TABLE ONE

| OUTPUT | PARAMETER | BATCH SIZE | DISTRIBUTION |
|---|---|---|---|
| Binary | P | 1 | Bernoulli Distribution |
| Binary | P | n | Binomial Distribution |
| Binary | $p_1, p_2$ | n | Batch Double Dichotomies |
| Continuous | μ | 1 | Normal Distribution |
| Continuous | μ ≠ $μ_0$ | 1 | Normal Distribution |

Figure 4A:
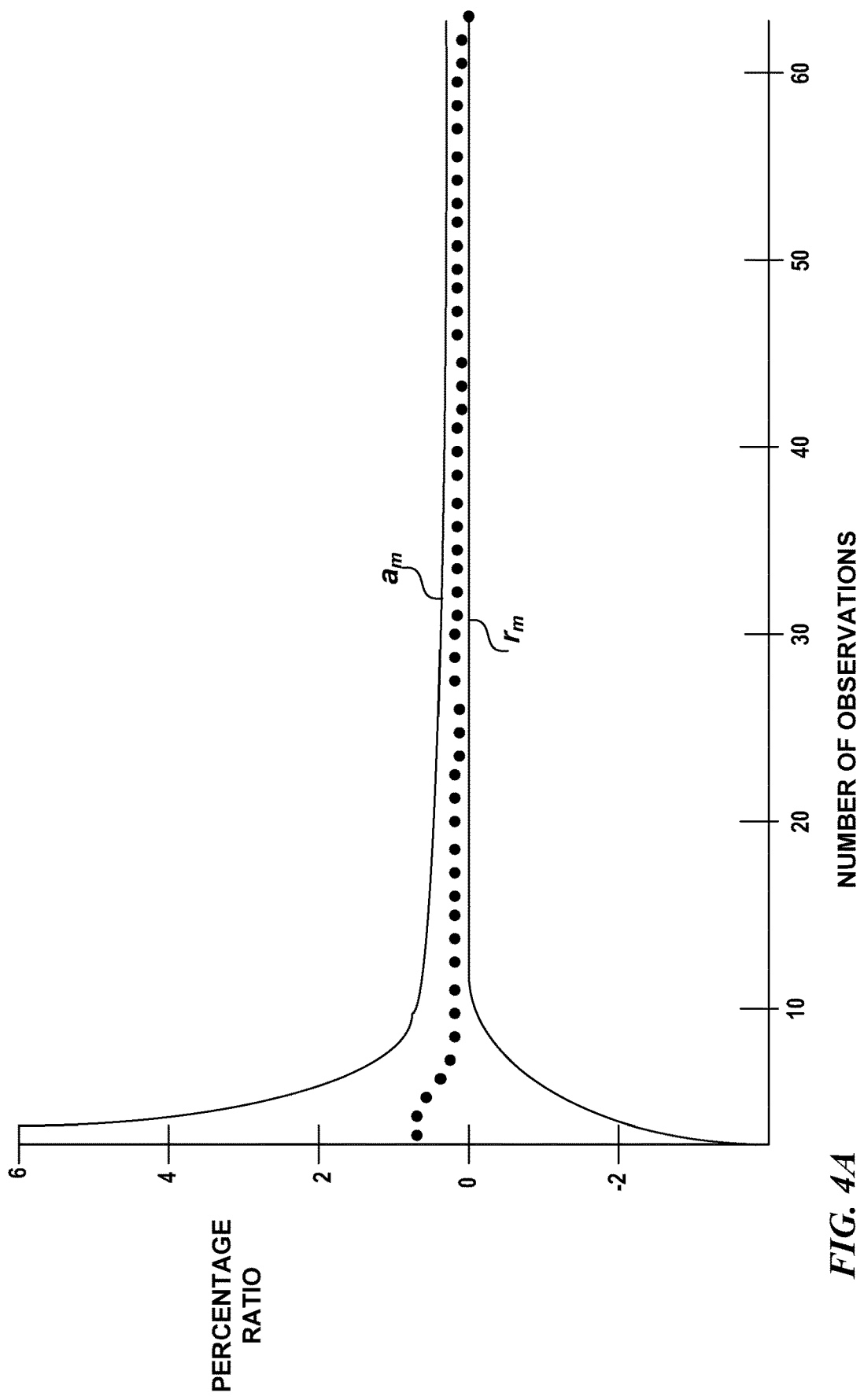
FIGS. 4A-4B are graphs illustrating results from the dynamic experimentation evaluation system.
Figure 4B:
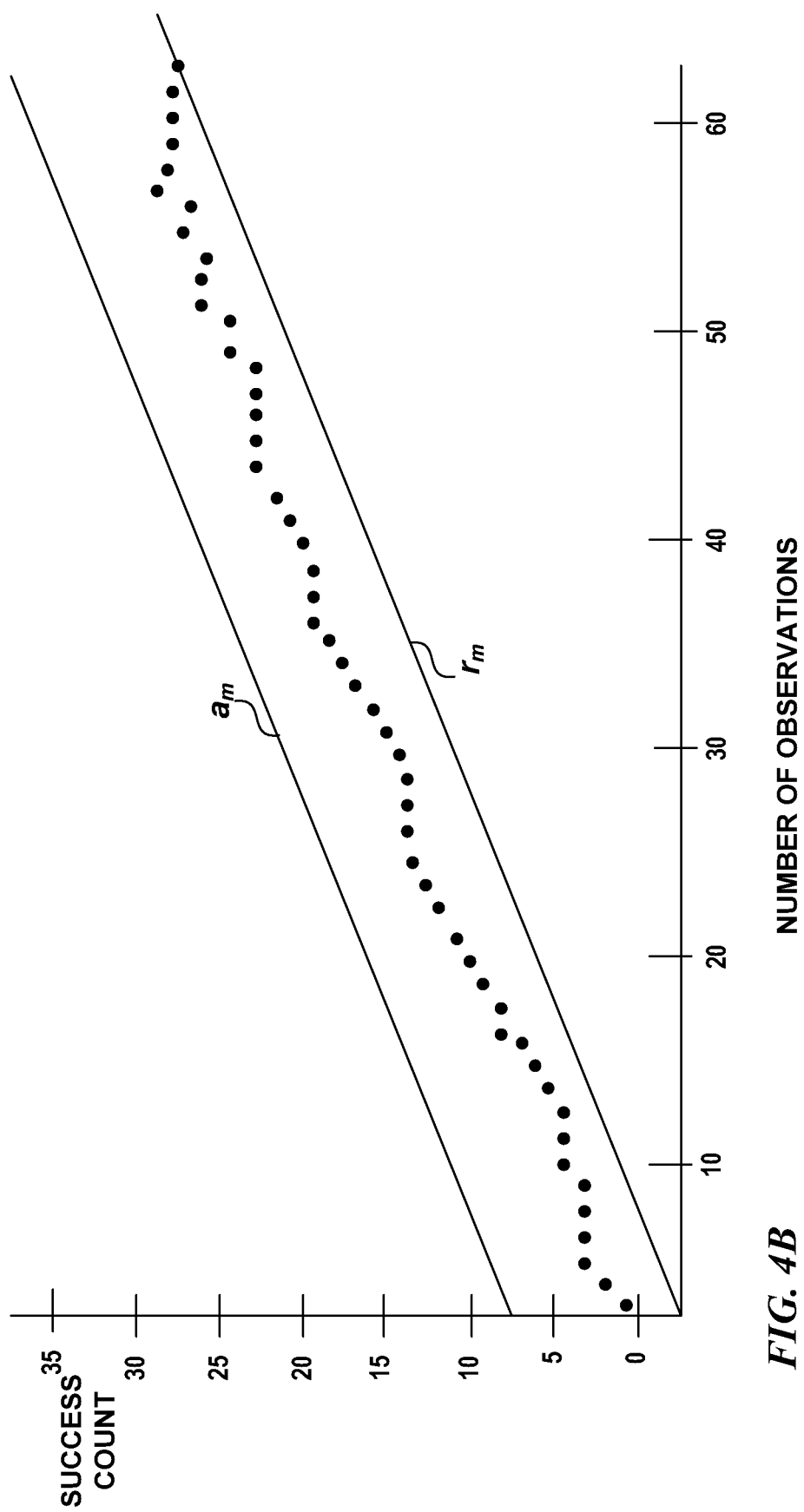

Attention now turns to FIGS. 4A and 4B which illustrate two different ways to illustrate the outcome of an experiment. FIG. 4A represents the percentage of successes and FIG. 4B represents the sum of the successes. FIG. 4A is more interpretable to determining the differences between the two conversion rates since graph shows the width of the distance between $a_m$ and $r_m$ decreasing over time until the test terminates. FIG. 4B illustrates the acceptance or resection of the null hypothesis since the width between $a_m$ and $r_m$ is constant.

The graph in FIG. 5A shows the number of observations on the x-axis and the percentage ratio of the successes are on the y-axis. For example, the percentage ratio of the successes may illustrate the percentage of customers visiting the download web page to the event of successfully installing the software product. The percentage ratio can be computed as follows:

$$\frac{(1-p0)p1}{(1-p0)p1 + p0(1-p1)}.$$

FIG. 5A shows the upper bound threshold, $a_m$, and the lower bound threshold $r_m$ and the distance between these two bounds decreases over time making it easy to visually detect the differences in the conversion rates.

FIG. 4B is a graph representing the overall accumulated sum of the successes, Z. In FIG. 4B, the x-axis shows the number of observations and the y-axis shows the accumulated sum of the successes. This graph is used to ascertain whether the null hypothesis was accepted or ejected when the aggregated sum of the successes crosses one of the thresholds, $a_m$ or $r_m$.

Exemplary Operating Environment

Figure 5:
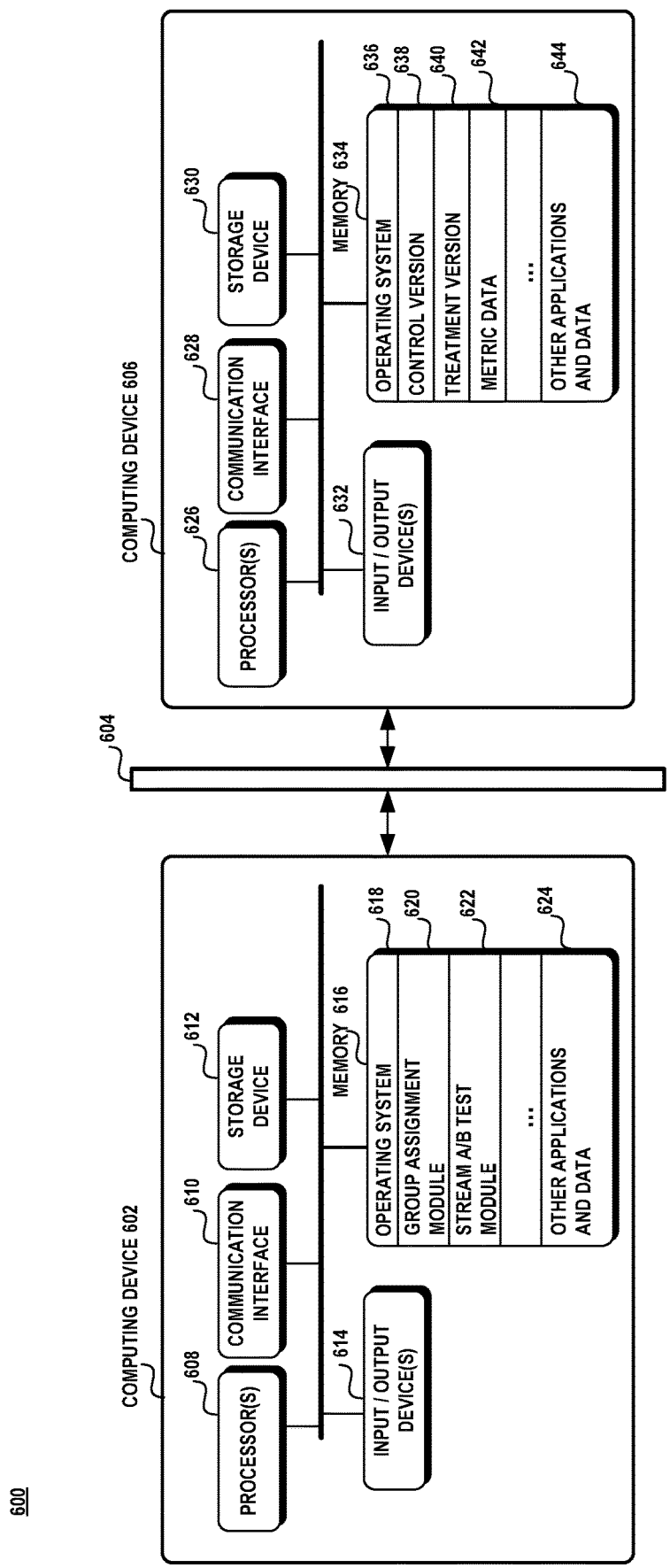
FIG. 5 is a block diagram illustrating a second exemplary operating environment.

Attention now turns to a discussion of an exemplary operating embodiment. FIG. 5 illustrates an exemplary operating environment 600 that includes at least one computing device 602 that serves as the dynamic evaluation experimentation system coupled by a network 604 and to one or more computing devices 606 associated with users. In one aspect, the dynamic experimentation evaluation system may be configured as a cloud service that provides a framework for developers to test and evaluate different versions of a software product using the techniques described herein.

A computing device 602, 606 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 600 may be configured in a network environment, a distributed environment, a multi-processor environment, or a stand-alone computing device having access to remote or local storage devices.

A computing device 602, 606 may include one or more processors 608, 626 a communication interface 610, 628 one or more storage devices 612, 630 one or more input and output devices 614, 632 and a memory 616, 634. A processor 608, 626 may be any commercially available or customized processor and may include dual microprocessors and multi-processor architectures. The communication interface 610, 628 facilitates wired or wireless communications between the computing device 602, 606 and other devices. A storage device 612, 630 may be a computer-readable medium that does not contain propagating signals, such as modulated data signals transmitted through a carrier wave. Examples of a storage device 612, 630 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 612, 630 in the computing device 602, 606. The input/output devices 614, 632 may include a keyboard, mouse, pen, voice input device, touch input device, display, speakers, printers, etc., and any combination thereof.

The memory 616, 634 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 616, 634 may also include one or more external storage devices or remotely located storage devices that do not pertain to propagated signals, such as modulated data signals transmitted through a carrier wave.

The memory 616, 634 may contain instructions, components, and data. A component is a software program that performs a specific function and is otherwise known as a module, program, engine, and/or application. The memory 616 of computing device 602 may include an operating system 614, a group assignment module 616, a stream AB test module 618, and other applications and data 620. The memory 634 of computing device 606 may include an operating system 636, a control version of a software product 638, a treatment version of a software product 640, metric data 642 and other applications and data 644.

The network 604 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of predicting the performance and reliability of a new or treatment version of a program by comparing the users' behavior with a control version of the program. The technical features associated with addressing this problem uses evaluation techniques that continuously monitor the users' behavior by evaluating, in real-time, the differences in the users' behavior until statistical significance is achieved. The dynamic evaluation of the users' behavior has the technical effect of detecting when to terminate the test under the constraints of achieving the desired error rate thereby reducing the amount of computing resources used to perform the test. In addition, the real-time evaluation is able to provide real-time alerts when a target situation is detected thereby saving computing resources over incurring additional expenses by delayed reactions.

CONCLUSION

A system is disclosed having one or more processors and a memory coupled to the one or more processors. The one or more processors are configured to: continuously monitor, in real-time, user interactions from a control group and user interactions from a treatment group, the control group testing a control version of a software product, the treatment group testing a treatment version of the software product, the control version of the software product different from the treatment version of the software product; based on the monitored user interactions, determine in real-time whether to conclude the continuous monitoring based on a sequential probability ratio test (SPRT) that detects a statistically significant effect between the users in the treatment group from the users in the control group; and terminate the continuous monitoring when the statistically significant effect is detected.

The one or more processors are further configured to: terminate the continuous monitoring when the SPRT test detects a statistically significant improved effect from the users in the treatment group than the users in the control group; continue the continuous monitoring when the SPRT does not detect a statistically significant improvement or worsening effect from the users in the treatment group; assign a first percentage of users to the control group and a second percentage of users to the treatment group before the continuous monitoring occurs; calculate a new value for the first percentage of users assigned to the control group and a new value for the second percentage of users assigned to the treatment group when the SPRT does not detect a statistically significant improvement or worsening effect from the users in the treatment group; assign new users to the control group and the treatment group in accordance with the new value for the first percentage of users assigned to the control group and the new value for the second percentage of users assigned to the treatment group; and raise an alert to terminate users of the treatment group to cease usage of the software product upon detection of the worsening effect of the treatment version.

A device is disclosed having one or more processors and a memory. There is at least one module having instructions that when executed on the one or more processors performs actions that: continuously evaluate, in real-time, differences in metric data from a control version of a software application with metric data from a treatment version of the software application; and terminate the continuous real-time evaluation when a sequential probability ratio test (SPRT) indicates a statistical significance between the metric data from the control version and the metric data from the treatment version.

The statistical significance is based on the SPRT indicating that a conversion rate for the treatment version is greater than a conversion rate for the control version or based on the SPRT indicating that a conversion rate for the control version is greater than a conversion rate for the treatment version. Statistical significance is based on a Type I error rate that defines a probability of a false positive and a Type II error rate that defines a probability of a false negative. The metric data represents a success or failure associated with an event occurring during usage of the software application.

A method is disclosed that may operate on the system and devices disclosed that configures an A/B test to evaluate a control version of a software product with a treatment version of the software product on a continuous stream of metric data in real-time, the metric data from users of the control version and from users of the treatment version; assigns a first percentage of users to a control version and a second percentage of users to the treatment version, the first percentage of users and the second percentage of users representing an estimate of metric data needed to achieve a target error rate; continuously evaluates, in real-time, metrics from users of the control version with metrics from users of the treatment version using a sequential probability ratio test (SPRT); detects from the SPRT no statistically significant difference from the metrics from the users of the control version with the metrics from the users of the treatment version; assigns new users entering the A/B test to the control version based on a third percentage and to the treatment version based on a fourth percentage; and continuously evaluates metrics, in real-time, from the control version with metrics from the treatment version until the SPRT indicates statistical significance.

The first percentage of users and the second percentage of users are based on a power analysis. The A/B test is configured with a null hypothesis that assumes a conversion rate of the treatment version that is statistically more significant than a conversion rate of the control version.

The method terminates the A/B test upon the SPRT indicating a statistically greater difference between metrics from the control version and the treatment version. Statistical significance is determined based on a Type I error rate that defines a probability of a false positive. The statistical significance may also be determined based on a Type II error rate that defines a probability of a false negative. The method terminates the A/B test upon acceptance of a null hypothesis when an accumulated sum of metric differences being smaller than a lower bound represented by $[\log \beta/(1-\alpha)]/[(\log p1/p0) - \log (1-p1)/(1-p0)] + n [(\log (1-p1)/(1-p0))/(\log p1/p0 - \log (1-p1)/(1-p0))$, where $\alpha$ is the Type I error rate, $\beta$ is the Type II error rate, p0 is a conversion rate for the control version and p1 is a conversion rate for the treatment version.

The method may be terminate the A/B test upon acceptance of an alternative hypothesis when an accumulated sum of metric differences being larger than an upper bound represented by $[\log (1-\beta)/\alpha]/[(\log p1/p0) - \log (1-p1)/(1-p0)] + n [(\log (1-p1)/(1-p0))/(\log p1/p0 - \log (1-p1)/(1-p0))$, where $\alpha$ is the Type I error rate, $\beta$ is the Type II error rate, p1 is a conversion rate for the control version and p2 is a conversion rate for the treatment version.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, comprising:
   configuring an A/B test to evaluate performance of a control version of a software product with performance of a treatment version of the software product by assigning a first percentage of users to utilize a control version of a software product and a second percentage of users to utilize a treatment version of a software product, wherein the A/B test utilizes a sequential probability ratio test (SPRT) to generate a test statistic that is compared against an upper bound threshold and a lower bound threshold to determine statistical significance to terminate the A/B test;
   receiving, via a network, a continuous stream of metric data obtained in real-time as users of the control version of the software product utilize the control version and users of the treatment version of the software product use the treatment version, the metric data includes a measurement associated with an event that occurs during operation of a version of the software product, wherein the measurement is represented by a metric value;
   computing the test statistic for each effective sample pair received, an effective sample pair includes a first metric value from a user of the control version and a second metric value from a user of the treatment version, wherein the effective sample pair shows a failure and a success from a same event;
   continuously comparing the test statistic with the lower bound threshold and the upper bound threshold to determine statistical significance;
   upon detecting from the SPRT no statistically significant difference, assigning new users to the control version based on a third percentage and to the treatment version based on a fourth percentage;
   if the SPRT indicates that performance of the treatment version is significantly worse than performance of the control version, then terminating usage of the treatment version; and
   terminating the A/B test when the SPRT indicates that statistical significance is achieved.

2. The method of claim 1, wherein the first percentage of users and the second percentage of users are based on a power analysis.

3. The method of claim 1, wherein the A/B test is configured with a null hypothesis that assumes a conversion rate of the treatment version that is statistically more significant than a conversion rate of the control version.

4. The method of claim 1, further comprising:
terminating the A/B test upon the SPRT indicating a statistically greater difference between metrics from the control version and the treatment version.

5. The method of claim 1, wherein statistical significance is determined based on a Type I error rate that defines a probability of a false positive.

6. The method of claim 1, wherein statistical significance is determined based on a Type II error rate that defines a probability of a false negative.

7. The method of claim 1, further comprising:
terminating the A/B test upon acceptance of a null hypothesis when an accumulated sum of metric differences being smaller than a lower bound threshold represented by $[\log \beta/(1-\alpha)]/[(\log p_1/p_0)-\log (1-p_1)/(1-p_0)]+n [(\log (1-p_1)/(1-p_0))/(\log p_1/p_0 - \log (1-p_1)/(1-p_0))$, where $\alpha$ is the Type I error rate, $\beta$ is the Type II error rate, $p_0$ is a conversion rate for the control version, $p_1$ is a conversion rate for the treatment version, and n is an estimate of the sample size.

8. The method of claim 1, further comprising:
terminating the A/B test upon acceptance of an alternative hypothesis when an accumulated sum of metric differences being larger than an upper bound threshold represented by $[\log (1-\beta)/\alpha]/[(\log p_1/p_0)-\log (1-p_1)/(1-p_0)]+n [(\log (1-p_1)/(1-p_0))/(\log p_1/p_0 - \log (1-p_1)/(1-p_0))$, where $\alpha$ is the Type I error rate, $\beta$ is the Type II error rate, p1 is a conversion rate for the control version, p2 is a conversion rate for the treatment version, and n is an estimate of a sample size.

9. A device, comprising:
one or more processors and a memory;
wherein the memory includes at least one module having instructions that when executed on the one or more processors performs actions that:
continuously evaluates, in real-time, performance of a control version of a software application and a treatment version of the software application, using effective sample pairs from the control version and from the treatment version as a first set of users utilize the control version and a second set of users utilize the treatment version, the effective sample pairs received in a continuous stream, an effective sample pair includes a first metric value from a user of the control version and a second metric value from a user of the treatment version, wherein the effective sample pair shows a failure and a success from a same event, wherein an event occurs during execution of a version of the software application triggered by an action of a user action with the software application;
utilizing a sequential probability ratio test (SPRT) to generate a test statistic with an effective sample pair of a same event;
comparing the test statistic against an upper bound threshold and a lower bound threshold to determine existence of a statistically significant effect;
when no statistically significant effect is detected, calculate a first percentage of new users to add to the control group and a second percentage of new users to add to the treatment group;
if the SPRT indicates that performance of the treatment version is significantly worse than performance of the control version, then generating an alert about usage of the treatment version; and
when a statistically significant effect is detected, terminate the continuous real-time evaluation.

10. The device of claim 9, wherein the statistically significant effect is based on the SPRT indicating that a conversion rate for the treatment version is greater than a conversion rate for the control version.

11. The device of claim 9, wherein the statistically significant effect is based on the SPRT indicating that a conversion rate for the control version is greater than a conversion rate for the treatment version.

12. The device of claim 9, wherein the statistically significant effect is based on a Type I error rate that defines a probability of a false positive and a Type II error rate that defines a probability of a false negative.

13. A computer system, comprising:
one or more processors; and
a memory coupled to the one or more processors;
wherein the one or more processors are configured to perform acts to:
receive a continuous stream of metric data, the continuous stream of metric data representing a measurement associated with an event that occurs during execution of a version of a software product, wherein the continuous stream of metric data is received from a control group executing a control version of a software product and a treatment group executing a treatment version of the software product, the control version of the software product different from the treatment version of the software product;
perform a comparison of an effective sample pair from the continuous stream of metric data using a test statistic computed from a sequential probability ratio test (SPRT), the effective sample pair includes a first metric value from a user of the control version and a second metric value from a user of the treatment version, wherein the effective sample pair shows a failure and a success of a same event;
when no statistically significant effect is detected by the test statistic, calculate a first percentage of new users to add to the control group and a second percentage of new users to add to the treatment group;
if the SPRT indicates that performance of the treatment version is significantly worse than performance of the control version, terminate usage of the treatment version; and
when a statistically significant effect is detected, terminate testing the control version and the treatment version.

* * * * *